United States Patent [19]

Muller et al.

[11] Patent Number: 4,501,350

[45] Date of Patent: Feb. 26, 1985

[54] FRUIT-DEPOSITING MECHANISM

[75] Inventors: John E. Muller; John E. Muller, Jr., both of Yakima, Wash.

[73] Assignee: Pomona Service & Supply Co., Inc., Yakima, Wash.

[21] Appl. No.: 359,329

[22] Filed: Mar. 18, 1982

[51] Int. Cl.³ ............................................. B65G 29/00
[52] U.S. Cl. .................................... 198/478; 198/483; 198/535; 198/715
[58] Field of Search ............... 198/715, 502, 810, 857, 198/865, 706, 712, 732, 802, 697, 535, 478, 483; 414/295, 300, 87, 88; 53/244, 259, 248

[56] References Cited

U.S. PATENT DOCUMENTS

| | | | |
|---|---|---|---|
| 2,956,668 | 10/1960 | Fioravanti | 198/715 |
| 3,019,581 | 2/1962 | Phillips, Jr. et al. | 53/244 |
| 3,147,846 | 9/1964 | Huntoon | 53/248 |
| 3,381,796 | 5/1968 | Gregor | 198/706 |
| 4,067,432 | 1/1978 | Powell, Sr. | 198/865 |
| 4,194,343 | 3/1980 | Myers et al. | 198/535 |
| 4,360,308 | 11/1982 | Gillord et al. | 414/295 |

FOREIGN PATENT DOCUMENTS 1020205 2/1966 United Kingdom .................. 414/88

Primary Examiner—Joseph E. Valenza
Assistant Examiner—Kyle E. Shane
Attorney, Agent, or Firm—Robert W. Beach; Ward Brown

[57] ABSTRACT

Bruising of fruit in a fruit bin filling operation accomplished by mechanism including an elevationally adjustable endless fruit-depositing conveyor having fruit-carrying pockets is minimized by mounting the pocket dividers so that they may swing between a position substantially perpendicular to the endless conveyor and a position sloping outward and backward away from the direction of movement of the endless conveyor. This feature eases movement of fruit from the supply conveyor to the depositing conveyor and eliminates flipping of fruit out of the depositing conveyor discharge by the pocket divider behind the fruit being deposited. Also a slightly declined support plate is swingably mounted to the depositing conveyor discharge end and maintained in such slightly declined attitude as the depositing conveyor is swung about a horizontal axis to change the elevation of the discharge end of such conveyor.

4 Claims, 9 Drawing Figures

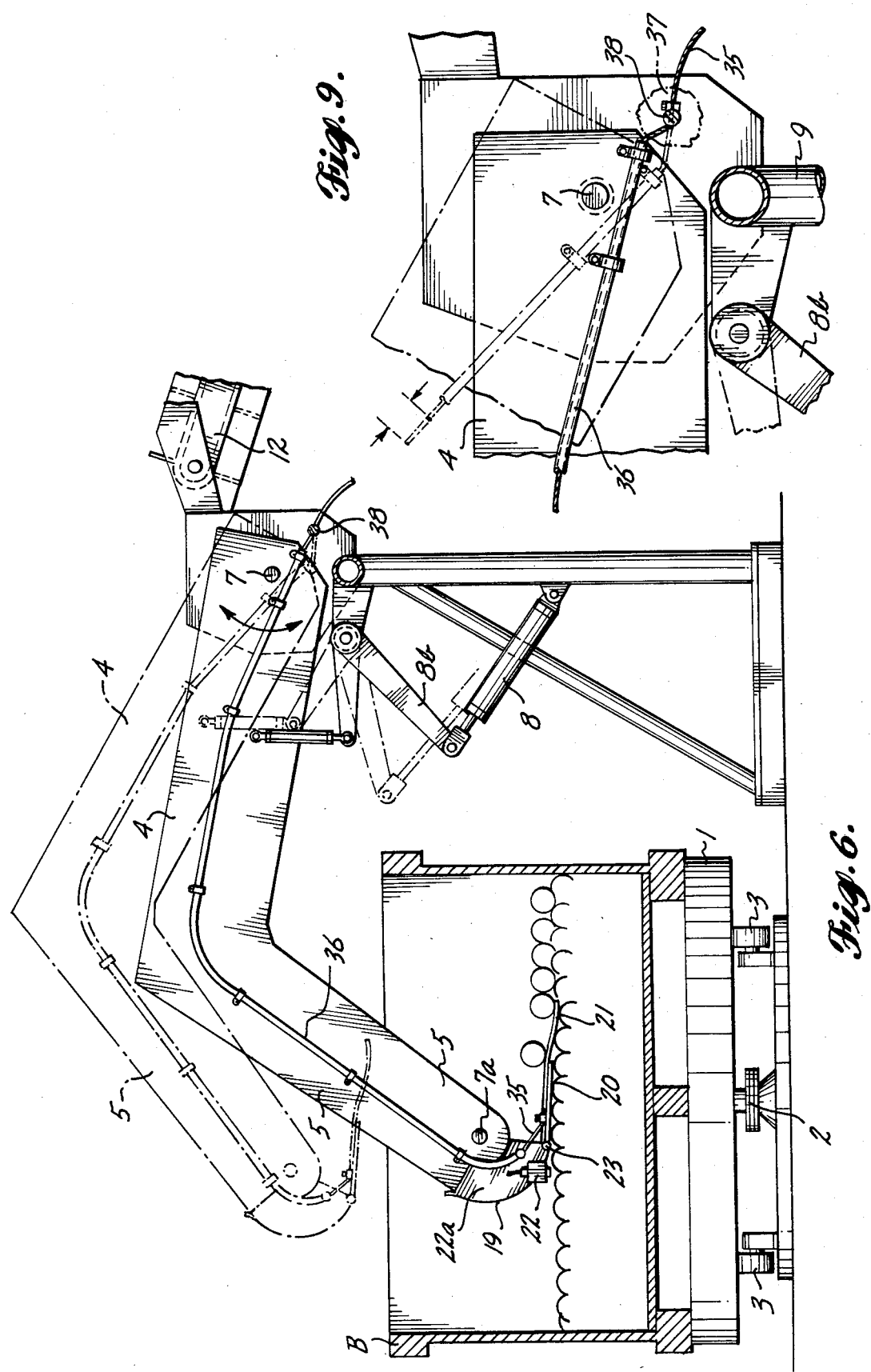

FRUIT-DEPOSITING MECHANISM

BACKGROUND OF THE INVENTION

1. Field of the Invention

The present invention relates to improved mechanism for depositing fruit and, in particular, to such mechanism which can be used to fill a receptacle, such as a bin, with fruit.

2. Prior Art

Huntoon, U.S. Pat. No. 3,147,846, describes a similar earlier fruit-depositing mechanism for depositing delicate fruit, such as apples, gently and automatically in a fruit bin. Fruit bins customarily used for storing apples, for example, are approximately 4 feet (1.2 meters) by 4 feet (1.2 meters) and 2 feet deep (0.6 meters) internally. Since such bins, when loaded are transported by forklift trucks, it is unsatisfactory to deposit the fruit in only one location in the bin because one fruit is likely to be bruised by striking other fruit or the sides of the bin in rolling down from a mound of the fruit caused by jerking of the bin when being transported. Moreover, such fruit does not roll very readily unless the mound is reasonably high, which would prevent a bin being filled automatically to a substantially level condition. There is the further problem of depositing the fruit gently onto other fruit in the bin irrespective of the depth of the fruit. It is very undesirable to drop the fruit even a short distance because, while bruises would not appear immediately, they would be very likely to show up eventually. Even slight bruises detract from both the appearance and the keeping qualities of the fruit and consequently lower the grade of the fruit.

Even distribution of the fruit in a bin generally of the size mentioned above was accomplished by the mechanism disclosed in the Huntoon patent referred to above by rotating the bin and depositing the fruit into it at a location generally midway between the sidewall of the bin and the axis about which the bin is rotated. Bruising of the fruit was minimized by conveying the fruit into the bin in pockets of an endless conveyor, which conveyor included a curved discharge plate mounted on the conveyor frame at the end of the conveyor and a flexible apron extending from the lower portion of the curved plate, and providing relative elevational adjustment of the bin and the conveyor curved plate discharge.

While the Huntoon mechanism accomplishes automatic loading of a fruit bin with fruit, the fruit tends to drop into the conveyor pockets from a supply conveyor at the supply end of the depositing mechanism, which may result in bruising the fruit, and the pocket dividers of the Huntoon endless conveyor tend to "flip3[ the fruit out of the curved plate discharge, imparting momentum resulting in colliding of one fruit with other fruit or the bin walls, or producing friction between the fruit and the flexible apron, any of which can cause bruising or blemishes.

The conveyor system shown in the Fioravanti U.S. Pat. No. 2,956,668 includes swingable arms which support a flexible fabric forming conveyor pockets. However, to discharge the Fioravanti conveyor pockets, the support arms are swung so that the distance between the remote ends of the arms defining the conveyor pocket being discharged increases and the flexible sheet is drawn taut. This increases the momentum of the conveyed material insuring that it is discharged, but such momentum increase would tend to bruise or damage delicate articles.

SUMMARY OF THE INVENTION

It is a principal object of the present invention to provide a fruit-depositing mechanism which will lower delicate fruit, such as apples, gently but quickly and automatically so that a receptacle, such as a fruit bin, can be filled without the aid of hand labor while minimizing risk of bruising and abrasion. In thus filling a receptacle, it is an important object that any change in momentum of the fruit be gradual so that the fruit will not bump other fruit or the sides of the receptacle with sufficient force to bruise the fruit.

Another object of the invention is to minimize friction between the fruit and the depositing mechanism to avoid abrasion of the fruit.

To accomplish the foregoing objects, the fruit depositing mechanism of the Huntoon patent, which was identified above and is incorporated by reference, is modified to include swingable pocket dividers to ease transfer of the fruit from a supply conveyor to the fruit-depositing conveyor and from the fruit-depositing conveyor into the bin, and a support plate carried by the end of the curved discharge plate which is swingable and controlled to be maintained substantially horizontal irrespective of the angle of swing of the depositing conveyor. Also the Huntoon mechanical elevating control sensing mechanism is replaced with an infrared sensor to effect swinging of the depositing conveyor for maintaining its lower end slightly above the previously deposited fruit.

The free edges of the pocket dividers are swung back from perpendicular to the conveyor movement path in the direction opposite the direction of conveyor movement at the point of transfer of the fruit from a supply conveyor to the depositing conveyor. By such tilting the flexible sheet between the adjacent pocket dividers provides a generally planar ramp without appreciable bumps down which the fruit rolls from the higher supply conveyor to the lower depositing conveyor.

By enabling the pocket dividers to swing in the direction opposite the direction of conveyor movement at the point of discharge, the pocket dividers will not "flip" the fruit ahead of each pocket divider as it swings around the lower end of the conveyor but such divider will hang loosely to allow the fruit to roll down the gently inclined support plate. The support plate also maintains all but the very end of the flexible apron of the fruit previously deposited so that neither previously deposited fruit nor the fruit being deposited is bruised.

BRIEF DESCRIPTION OF THE DRAWINGS

FIG. 3 is an enlarged detail section of the feed portion of the depositing conveyor and FIG. 4 is an enlarged detail section of an adjacent upper portion of the depositing conveyor, parts being broken away.

FIG. 6 is a side elevation of the depositing conveyor in a lowered position with the conveyor shown in a raised position in phantom, parts being broken away.

FIG. 9 is an enlarged detail elevation of an upper portion of the depositing conveyor, parts being broken away, showing the support plate cable feed end attachment in one position in full lines and in a second position in phantom.

DETAILED DESCRIPTION

Figure 1:
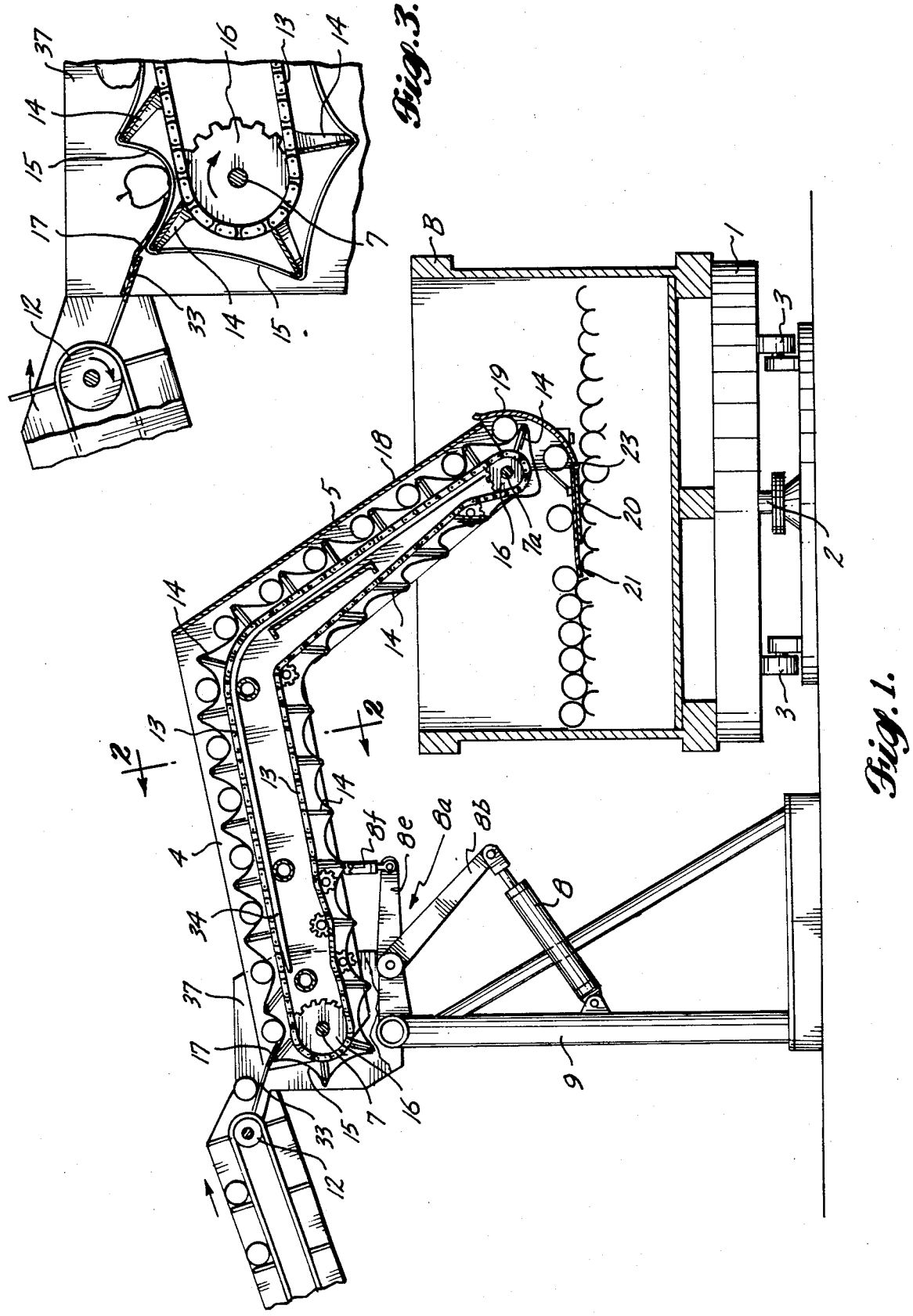
FIG. 1 is a side elevation of the depositing mechanism with a supply conveyor, a bin and a turntable, parts being shown in section.

Uniform distribution of the fruit in a bin can be accomplished by rotating the bin and depositing the fruit into it at a location generally midway between the side wall of the bin and the axis about which the bin is rotated. In FIG. 1 the bin B is shown supported on a turntable 1 which is rotated about the axis of a central support 2 by suitable drive mechanism which is not shown. The turntable is rotatively supported by rollers 3 which turn about axes extending radially from the rotative axis of the central support 2. The speed at which the turntable will be rotated depends upon the rate at which fruit is deposited in the bin. Preferably the speed of rotation is such as to enable one continuous layer of fruit to be laid in the bin from its central portion to the bin sides during one rotation of the turntable. The fruit-depositing conveyor is of generally angle shape and includes a generally horizontal supporting leg or stretch 4 and a generally upright supported leg or stretch 5 depending from the supporting leg, which legs preferably are angularly fixed relative to each other.

In order to load fruit into the bin B gently from its bottom to its top, it is necessary to provide relative elevational adjustment of the bin and the lower end of the generally upright conveyor leg 5. It is preferred that the change in elevation be effected by raising and lowering the upright leg of the depositing conveyor rather than by changing the elevation of the bin B. The height of the lower end of the depositing conveyor's upright leg can be altered conveniently by mounting the end of the conveyor's generally horizontal leg on a horizontal pivot 7 about which the entire conveyor can swing in a vertical plane. As shown in FIG. 1, the actuator 8 variable in effective length cooperates with the bell crank 8a and pivot 7 to support and guide the conveyor for swinging movement. Such actuator, which preferably is a fluid pressure jack, extends between a support 9 and the bell crank. The actuator is varied in effective length to effect swinging of the conveyor about pivot 7.

Figure 2:
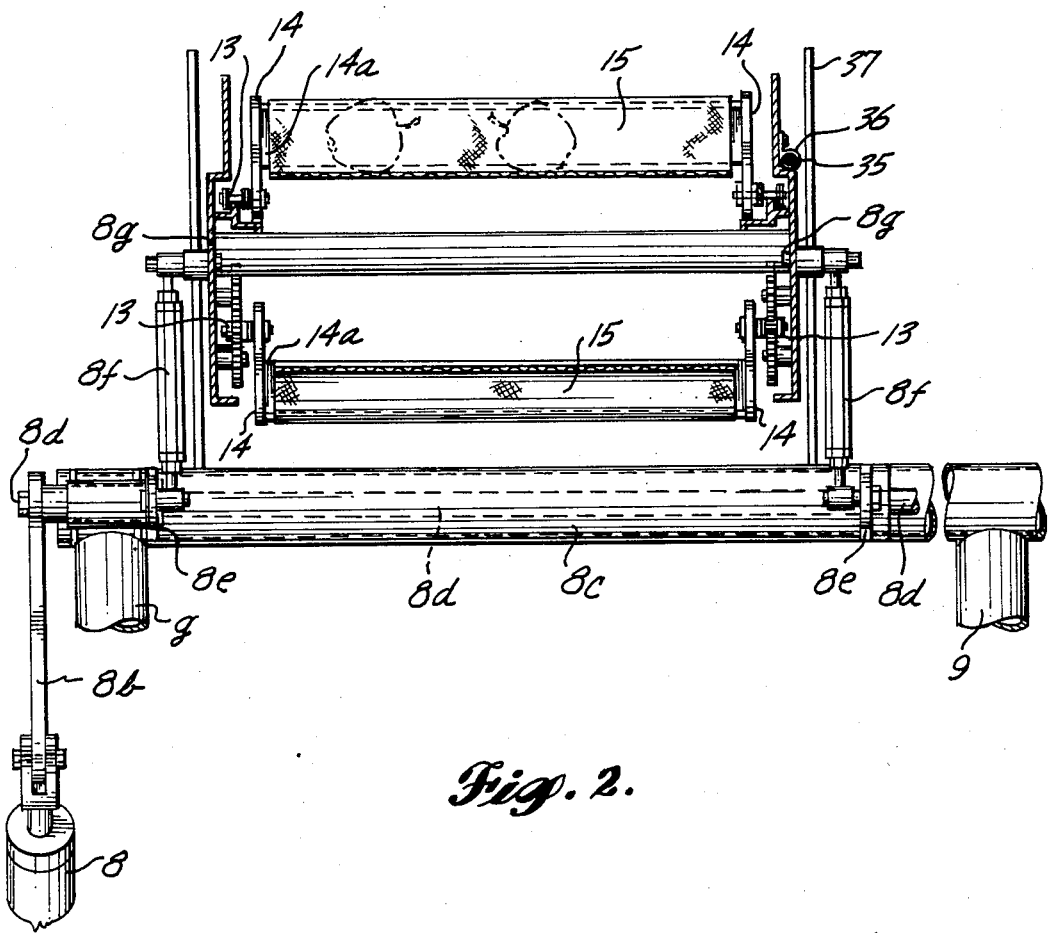
FIG. 2 is a transverse section through the depositing conveyor on the line 2—2 of FIG. 1.

As shown in FIGS. 1, 2 and 6, the bell crank includes a lower arm 8b to which the jack 8 is pivotally connected. The lower arm is welded to a sleeve 8c, shown in FIG. 2, which turns about axle 8d. One end of each of two upper arms 8e is welded to the sleeve 8c. Each of two turnbuckles 8f has one end pivotally connected to the swinging end of an upper bell crank arm 8e and its other end piovtally connected to the conveyor frame 8g, shown in FIG. 2. The lowest elevational position of the lower portion of the supported conveyor leg 5 adjacent to the bottom of the bin B is determined by reducing the effective length of the actuator 8 to a minimum and setting the desired elevation of the supported conveyor leg by adjusting the length of the turnbuckles 8f. As the effective length of the actuator 8 is then increased, the bell crank 8a, including lower arm 8b, turns sleeve 8c about the axle 8d, swinging the two upper arms 8e and turnbuckles 8f in unison to cause the conveyor to swing upward about pivot 7.

In FIG. 1, the depositing conveyor is shown in a position such that the lower end of its generally upright leg is in position to deposit fruit gently in a bin which is approximately half full. The jack 8 can be shortened to lower the conveyor to a lower position in which the lower end of the upright leg is disposed adjacent to the bottom of the bin B, and the jack can be extended to swing the conveyor upward about its pivot 7 into the broken line position shown in FIG. 6 in which the lower end of the generally upright leg 5 is disposed sufficiently above the upper edge of bin B to enable a fork lift truck to lift the bin easily off the turntable 1 and to place another bin on such turntable. Actually, when the conveyor is in the raised position enabling replacement of the bin, the supported leg 5, which has been designated as generally upright, may be more nearly horizontal than the supporting leg 4 which has been designated as being generally horizontal. The particular attitude of these legs will depend somewhat on the elevation of the supply conveyor 12 which feeds the fruit to the depositing conveyor, but in normal operation the supported leg including frame 5 will be more nearly upright than the supporting leg 4, as shown in FIG. 1, but its angle to vertical will vary.

The depositing conveyor includes endless chains 13 extending around guides so that the length of chain 13 extends along the length of conveyor frame legs 4 and 5. As shown in FIG. 2, two of such chains are located in spaced vertical planes and between these chains extend pocket dividers 14, best shown in FIGS. 4 and 5, having their opposite ends connected to the respective chains. A plate 14a bridges between the opposite ends of the pocket dividers. A flexible sheet or strip 15, preferably of fairly stiff fabric, is draped over these dividers along the length of the depositing conveyor to form flexible pockets between the dividers for receiving fruit. As shown in FIG. 1, when the chains turn around a guide, such as the sprocket 16 mounted concentric with the pivot 7, the outer ends of the dividers will be spread farther apart. The loops of the strip 15 between such dividers will be of sufficient length so as not to restrict such separating movement of the divider outer ends. Preferably the strip is secured to the outer edge portion of each of the dividers so that the extent of the strip between all adjacent dividers will be equal in size throughout the length of the conveyor. The dividers 14 will be spaced apart sufficiently to provide pockets of adequate, though not excessive, size to receive fruit between the dividers and the chains may be spaced apart sufficiently to enable more than one fruit to be received in each pocket. The extent of each pocket transversely of the conveyor shown in FIG. 2 is sufficient to enable each pocket to hold four large apples, six medium-sized apples, or eight small apples.

Figure 5:
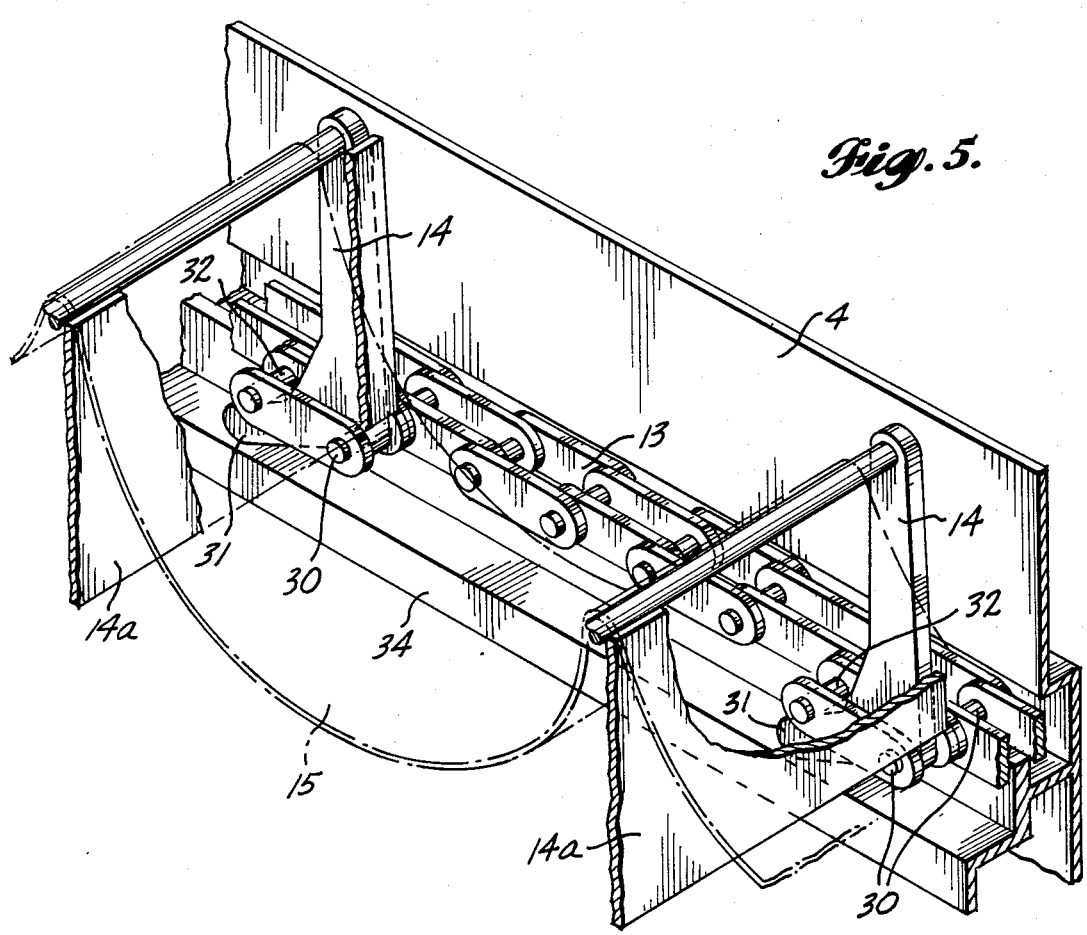
FIG. 5 is an enlarged detail perspective of an upper portion of the depositing conveyor, parts being broken away.
Figure 4:
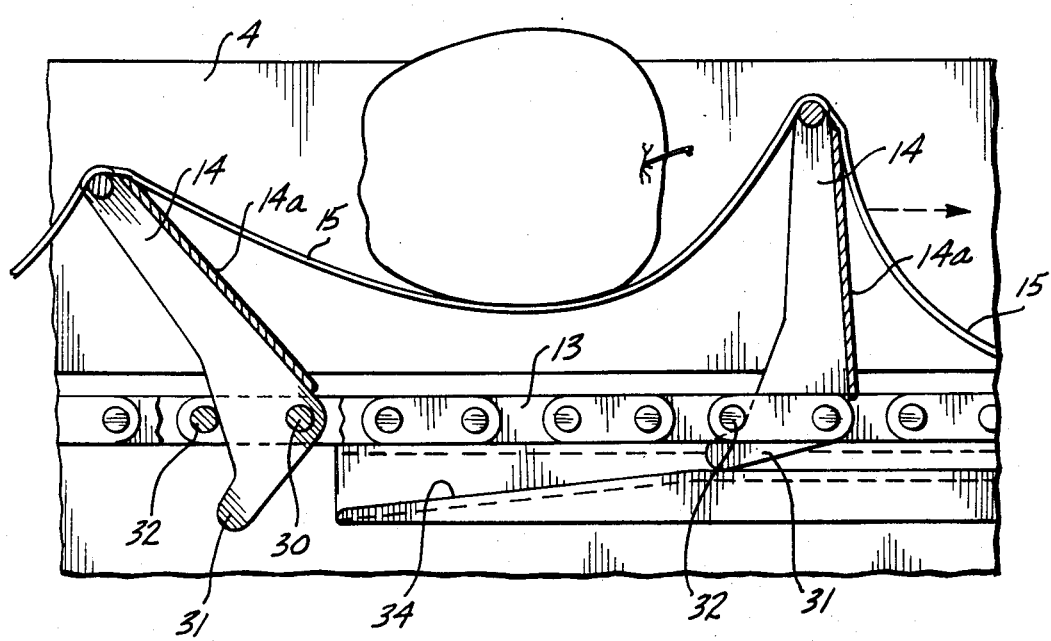

As best shown in FIGS. 4 and 5, the pocket dividers 14 are pivotally mounted on the endless conveyor chains 13 by pins 30 so that the dividers are swingable about axes extending transversely of the endless conveyor.

As best shown in the left side of FIG. 4, each pocket divider 14 is shaped so that swinging in the direction opposite the direction of conveyor movement is limited by the edge of the pocket divider 14 engaging the pin 32. Therefore, as the pocket divider travels around the upper sprocket 16 and past the supply conveyor 12, the weight of the pocket divider maintains it in an approximately 45° sloping positon outward and backward away from the direction of movement of the conveyor. The adjacent ends of the supply conveyor 12 and the depositing mechanism conveyor are correlated so that fruit can be transferred from the supply conveyor to the depositing conveyor by rolling down an inclined substantially planar surface to avoid damage to the fruit in whatever elevational position the depositing conveyor may be. A short flap 17 is provided to bridge the gap between the supply conveyor and the adjacent end of the depositing conveyor. This flap, being of flexible material, will drape over the adjacent end of the depositing conveyor beneath the flap. Since the pocket dividers slope outward and backward, the transition between the supply conveyor discharge ramp plate 33 and the pocket formed by the flexible strip 15 is least abrupt as shown in FIG. 3, and the fruit is eased from the supply conveyor discharge ramp plate to the depositing conveyor pocket without being bruised.

As the fruit is transported along the upper side of the supporting leg 4, the toe 31 of each pocket divider 14 can engage an inclined cam track 34 as shown in FIGS. 1 and 4. Such engagement causes the pocket divider to assume a perpendicular relationship with respect to the conveyor gradually and minimizes the abruptness in the change of shape of the pocket as the pocket dividers are swung into such perpendicular relationship.

Instead of positively erecting the dividers 14 successively by engagement of their toes 31 with the inclined cams 34 as described above, clockwise swinging of the dividers as seen in FIG. 4 to their limiting upright positions can be effected by gravity as the dividers pass from the supporting leg 4 of the depositing conveyor to the supported leg 5. As each divider moves from the supported leg to the supporting leg its weight and the weight of the fruit behind it will cause the divider to swing in the direction of conveyor belt movement until divider toe 31 contacts conveyor chain pin 32 when the divider is substantially perpendicular with respect to the endless conveyor as shown in FIGS. 1 and 4. Without the inclined cam 34 feature, the flexible strip 15 would tauten quickly tending to bounce the fruit which might bruise it.

The dividers maintain their perpendicular relationship to the conveyor as they move down the outer side of the upright supported leg 5 until the weight of the fruit is transferred to the curved discharge plate 19, shown in FIGS. 1, 6, 7 and 8. The pockets of the depositing conveyor formed by the strip 15 should be sufficiently deep and flexible so that the fruit will not roll out of such pockets in the generally upright supported leg of the conveyor until they approach its lower end portion. The supported leg of the depositing conveyor has a shield 18 extending along its side remote from the supply end of the conveyor to insure that the fruit will be retained in the pockets until it reaches the lower end portion of the generally upright leg.

Provision is made to lay the fruit gently onto the bin bottom, or onto fruit previously deposited in the bin, instead of dropping the fruit in order to avoid bruising either the fruit being deposited or fruit already in the bin. As the conveyor pockets are progressively inverted by movement of the pocket dividers 14 around the lower end of the depositing conveyor's upright leg, the fruit rolls gently onto the discharge plate 19 shown in FIG. 1 which is curved generally concentrically with the axle 7a of the lower conveyor chain sprockets 16a. Consequently, the curvature of this plate is concentric with the path of movement of the pocket dividers 14 to a location below the lower end of the upright supported leg 5. The manner in which the fruit rolls onto such plate is shown best in FIGS. 1, 7 and 8. As fruit begins to roll from a depositing conveyor pocket onto the plate 19, the weight of the fruit will be transferred gradually from the conveyor divider 14 ahead of it onto such plate until the entire weight of the fruit is borne by the plate. The fruit then continues to roll down the plate, but such rolling movement is retarded by engagement of the fruit with the hanging divider 14 ahead of it.

In operating the Huntoon fruit-depositing mechanism, instead of fruit gently rolling out of the curved plate 19 and down the flexible apron 21 solely by its own momentum, at times the fruit is flipped from the end of the curved plate 19 into the bin by an overtaking divider 14. This action of the divider imparts excessive momentum to the fruit which is dissipated by the fruit striking the sides of the bin or previously deposited fruit, causing bruising. This disadvantage is overcome by the support plate declining slightly from horizontal and by enabling the pocket dividers to swing on their pivots 30 relative to the conveyor so that their outer edges lag behind movement of the endless conveyor around the lower fruit-discharging end portion of the supported leg 5. Consequently, the spacing between the outer edges of adjacent dividers is reduced below the spacing between such outer edges which would exist if both of such adjacent dividers were perpendicular to the conveyor at the locations of their respective pivots 30 during travel of such adjacent dividers around the discharge end of the upright supported leg 5. Such approach movement of the outer edges of adjacent dividers slackens the flexible sheet or strip bridging between them as compared to what would be the condition of such strip if the dividers were maintained perpendicular to the conveyor chain 13.

Because each divider 14 is freely pivoted, its weight causes the outer edge of the divider to swing in the direction opposite the direction of conveyor movement around the discharge end portion of the supported leg 5 to a freely hanging vertical position as the divider travels along the underside of the supported leg 5 and supporting leg 4 upward from the lower end of the upright conveyor leg 5 as shown in FIG. 1. Therefore, as each divider travels around the lower end of the supported leg the divider does not flip the fruit from the pocket ahead of it but such fruit rolls gently down the curved plate 19 and the generally horizontal slightly declined support plate 20 beyond it while the divider behind it is lifted edgewise out of the path of the fruit.

When the divider ahead of the fruit moves upward out of the path of the fruit on the return stretch of the conveyor, the fruit will continue to roll down the gentle incline of support plate 20 on a flexible apron 21, preferably made of fabric, which lies on and is supported by the support plate. This apron covers the support plate and extends beyond its lower edge. Such apron has on it flexible ribs arranged in substantially parallel relationship at an angle to the direction of movement of the fruit as it rolls down the discharge plate 19. Fruit engaging such ribs are deflected by them toward the periphery of the bin B. The apron and ribs can be formed of rubber.

As has been mentioned, it is desirable to regulate the position of the lower end of the generally upright conveyor leg 5 elevationally in the bin B depending upon the depth of the fruit in the bin. Such elevation can be controlled by providing a photoelectric cell sensing element 22, shown mounted to the side plate 22a in FIG. 6, to sense the surface of the body of fruit in the bin. By this means the support plate 20 and all but the very end portion of the flexible apron 21 are maintained a minimal spaced distance above the previously deposited fruit so that bruising of the previously deposited fruit is minimized.

Figure 7:
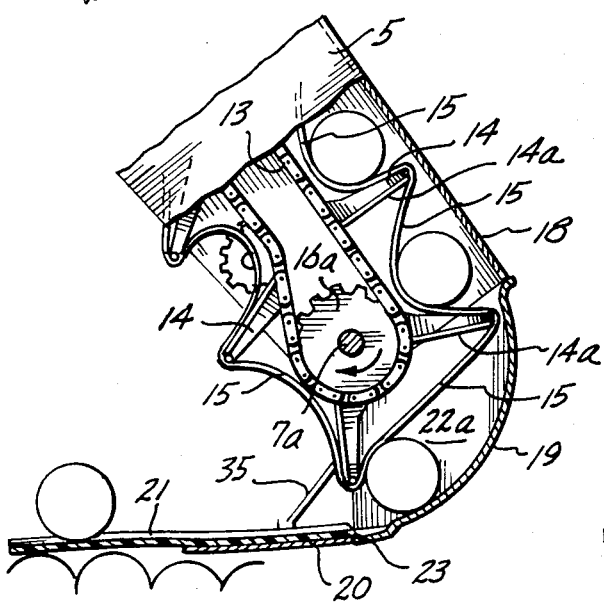
FIG. 7 is an enlarged detail vertical section through the lower portion of the depositing conveyor showing parts in one position and FIG. 8 is a similar enlarged detail vertical section showing parts in a different position.
Figure 8:
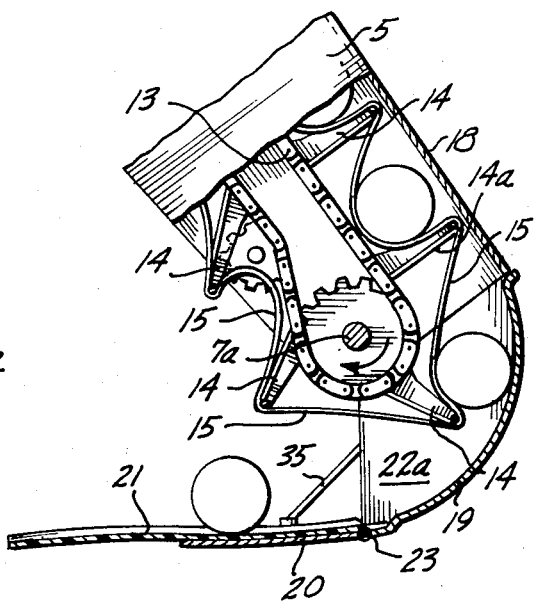

To maintain the support plate 20 in a generally horizontal slightly declining position relative to the depositing conveyor leg 5 irrespective of the depositing conveyor elevation, support plate 20 is mounted by a hinge 23 to the conveyor side plates 22a and a cable 35 is attached to the support plate about one-third of its length from the axis of its supporting hinge as shown in FIGS. 7 and 8. The cable is led through conduit 36 along the side of the supported leg 5 and supporting leg 4, as shown in FIG. 6, past the depositing mechanism pivot 7 and is secured to the stationary frame member 37 by clamp 38. The cable can be lengthened or shortened to establish the desired substantially horizontal position of the support plate and the cable secured in such initially adjusted position by the clamp 38. As the depositing mechanism is raised from the solid line position shown in FIGS. 6 and 9 to the dotted line position shown in those figures, the length of cable between the clamp 38 and the conduit 36 lengthens causing a corresponding decrease in length of the cable between the conduit 36 and the support plate 20, thereby maintaining the support plate in its slightly declining position.

In operation, the jack 8 will be extended to move the depositing conveyor into its upper broken-line position shown in FIG. 6. A bin B will then be placed on the turntable 1 and, by manual control, the actuator 8 will be reduced in effective length until the depositing conveyor is lowered to its lowermost position. Rotation of turntable 1 can then be started and supply conveyor 12 and the depositing conveyor can also be started. The turntable may be mounted shiftably to some extent, if desired, so as to locate the lower end of the depositing conveyor generally upright leg in the proper position between the bin wall and the rotative axis of the turntable depending upon the size of the bin.

After the first layer of fruit has thus been laid in the bottom of the rotating bin the sensor 22 will encounter such fruit layer when the bin has made a complete revolution and will initiate extension movement of the jack 8. Such extension movement will continue until the depositing conveyor has swung upwardly sufficiently to clear the layer of previously deposited fruit. The next layer of fruit will then be laid on the first layer by the plate 19, the support plate 20 and the apron 21 without the fruit being dropped and the depositing conveyor will remain at such elevation until the turntable has completed its second revolution. Thereupon the sensor 22 will effect the next upward increment of movement of the depositing conveyor by energization of jack 8. The conveyor will then remain in that position as the bin continues to be turned until the third layer of fruit has been deposited.

It should be understood that the fruit is not laid in the bin in precise layers because, depending upon the relative speed of fruit delivery by the depositing conveyor and the speed of rotation of the turntable 1, it may be that an incomplete layer of fruit will be deposited during one revolution of the bin. The important point, however, is that whenever the depth of fruit in the bin is sufficiently great, the jack 8 will be energized by the photoelectric sensing cell 22 to swing the depositing conveyor upward until the lower end of the conveyor's generally upright leg 5 is slightly above the surface of the bed of fruit in the bin. This relationship between the surface of the bed of fruit and the lower end of the depositing conveyor's generally upright leg 5 will be maintained by progressive automatic incremental upward swinging of the conveyor step-by-step as the bin-filling operation continues so that the fruit will always be laid gently on the surface of the body of fruit in the bin until the bin has been filled sufficiently, when the conveyors and turntable will be stopped. By manual control the jack 8 can then again be extended to swing the conveyor into the upper broken line position shown in FIG. 5 so that the filled bin B can be removed from the turntable 1 by a lift truck and the next empty bin placed on the turntable for filling.

We claim:

1. In a depositing mechanism, a depositing conveyor having a depending portion with a lower discharge end and including endless conveyor means extending around the depending portion of the conveyor, dividers carried by the endless conveyor means and having outer edges remote from the conveyor means and flexible sheet means bridging between the outer edges of adjacent dividers and defining between them conveying pockets, the improvement comprising divider pivot means mounting the dividers for swinging relative to the endless conveyor means about axes extending transversely of the direction of movement of the endless conveyor means, and control means for maintaining the dividers generally perpendicular to the endless conveyor means at locations remote from the lower discharge end for enabling swinging of the dividers on said divider pivot means as the dividers round the discharge end of the depending portion of the depositing conveyor for relative movement of the outer edges of adjacent dividers to reduce the distance between such outer edges below the spacing between such outer edges which would exist if both of such adjacent dividers were perpendicular to the conveyor means at the locations of their respective pivot means during travel of such dividers around such discharge end.

2. In the mechanism defined in claim 1, the control means enabling the dividers to swing on their pivot means relative to the conveyor means when the dividers are rounding the discharge end of the depending portion of the conveyor so that their outer ends lag behind movement of the conveyor means to slacken the flexible sheet means bridging between the outer edges of adjacent dividers.

3. In the mechanism defined in claim 1, means for changing the angle of the depositing conveyor depending portion relative to vertical, a generally flat support plate mounted on the depositing conveyor depending portion adjacent to its dicharge end, and support plate control means for effecting winding of said support plate relative to the conveyor depending portion as the angle of the conveyor depending portion is changed for maintaining said support plate generally horizontal despite such change in angle of the conveyor depending portion.

4. In the mechanism defined in claim 3, support means, pivot means mounting the depositing conveyor from said support means, hinge means mounting the support plate on the conveyor depending portion, and cable means having one end attached to the support plate and its other end attached to said support means at the side of the pivot means remote from the depositing conveyor.

* * * * *

UNITED STATES PATENT AND TRADEMARK OFFICE
CERTIFICATE OF CORRECTION

PATENT NO. : 4,501,350

DATED : February 26, 1985

INVENTOR(S) : John E. Muller and John E. Muller, Jr.

It is certified that error appears in the above-identified patent and that said Letters Patent are hereby corrected as shown below:

Column 8, line 54, cancel "winding" and insert ...swinging...

Signed and Sealed this

Ninth Day of July 1985

[SEAL]

Attest:

DONALD J. QUIGG

*Attesting Officer*   *Acting Commissioner of Patents and Trademarks*